United States Patent [19]

Shinohara et al.

[11] Patent Number: 5,211,018

[45] Date of Patent: May 18, 1993

[54] PEDESTAL MOUNT FOR BRAKE

[75] Inventors: Takayoshi Shinohara; Toshiyuki Suwa, both of Nagano, Japan

[73] Assignee: Nissin Kogyo Co., Ltd., Nagano, Japan

[21] Appl. No.: 784,188

[22] Filed: Oct. 29, 1991

[30] Foreign Application Priority Data

Dec. 25, 1990 [JP] Japan .............................. 2-401746[U]

[51] Int. Cl.⁵ .............................................. B60T 13/00
[52] U.S. Cl. ..................................... 60/547.1; 92/161; 91/376 R
[58] Field of Search .......................... 60/547.1; 92/161; 91/369.1, 369.2, 376 R

[56] References Cited

U.S. PATENT DOCUMENTS

Re. 31,911  6/1985  Ohta et al. .
4,296,680  10/1981  Ohta et al. .
4,557,179  12/1985  Takeuchi et al. ................... 91/369.2

FOREIGN PATENT DOCUMENTS 55-76742  6/1980  Japan .
55-76743  6/1980  Japan .
1231365  5/1971  United Kingdom .

Primary Examiner—Richard A. Bertsch
Assistant Examiner—Todd Mattingly
Attorney, Agent, or Firm—Armstrong, Westerman, Hattori, McLeland & Naughton

[57] ABSTRACT

A peripheral wall of a rectangular pedestal is formed bulged on the rear wall of a booster shell and attached to a vehicle body by four connecting bolts. The wall is comprised of a pair of shorter side walls parallel to shorter sides of the rectangle connecting axes of the four connecting bolts, a pair of longer side walls each bent so as to be gradually separated farther from the corresponding longer side of the rectangle at a central portion than at an end portion thereof, and four arcuate corner walls with each corner wall connecting the adjacent shorter and longer side walls. Thus, an intermediate portion of the longer side wall of the pedestal is increased in rigidity, so that an increased burden of stress can be imposed on such longer side wall. This moderates the stress concentration around the corners, thereby improving the durability of the booster shell.

2 Claims, 2 Drawing Sheets

PEDESTAL MOUNT FOR BRAKE

BACKGROUND OF THE INVENTION

1. Field of the Invention

The field of the present invention is vacuum boosters of a type in which a master cylinder for a brake or a clutch of an automobile is operated in a boosting manner by a vacuum pressure, and particularly, improvements of vacuum boosters comprising a rectangular pedestal which is formed bulged on an end wall of a booster shell and to which four connecting bolts are secured at four apexes of the rectangle surrounding an axis of the booster shell, the pedestal being attached to a vehicle body through the connecting bolts.

2. Description of the Prior Art

When the four connecting bolts for mounting the booster shell to a vehicle body are to be secured to a rear wall of the booster shell of the vacuum booster, the bolts are obliged to be disposed at four apexes of the rectangle owing to a structural restriction on the vehicle body. The pedestal formed on the end wall of the booster shell is thus formed into a corresponding rectangle surrounding the rectangle defined by the bolt (see Japanese Utility Model Application Laid-open No. 79058/82).

The present inventors have found that in a structure of the type described above, stress is concentrated around each corner of the rectangular pedestal when an axial tension load acts on the booster shell during a boosting operation. This is because the corners of the rectangular pedestal have a relatively large rigidity, while the central portions of its longer sides have a relatively small rigidity.

SUMMARY OF THE INVENTION

Accordingly, it is an object of the present invention to moderate the concentration of stress around the corners of the pedestal to provide an improvement in durability of the booster shell.

To achieve the above object, according to the present invention, there is provided a vacuum booster comprising a pedestal which is formed bulged on an end wall of a booster shell and to which four connecting bolts are secured at four apexes of a rectangle surrounding an axis of the booster shell, the pedestal being attached to a vehicle body through the connecting bolts, wherein the pedestal has a peripheral wall comprised of a pair of shorter side walls parallel to shorter sides of the rectangle, a pair of longer side walls with each side wall bent to be gradually separated farther from a corresponding one of the longer sides of the rectangle at a central portion than at an end portion thereof, and four arcuate corner walls with each corner wall connecting adjacent shorter and longer side walls.

With the above feature, the rigidity of the longer side wall of the pedestal is strengthened at an intermediate portion thereof and its load bearing capacity is increased, thereby ensuring that the concentration of stress around the corners of the pedestal can be moderated. This considerably improves the durability of the booster shell.

The above and other objects, features and advantages of the invention will become apparent from a reading of the following description of the preferred embodiment, taken in conjunction with the accompanying drawings.

BRIEF DESCRIPTION OF THE DRAWINGS

The drawings illustrate one embodiment of the present invention, wherein.

DESCRIPTION OF THE PREFERRED EMBODIMENT

The present invention will now be described by way of one embodiment in connection with the accompanying drawings.

Figure 1:
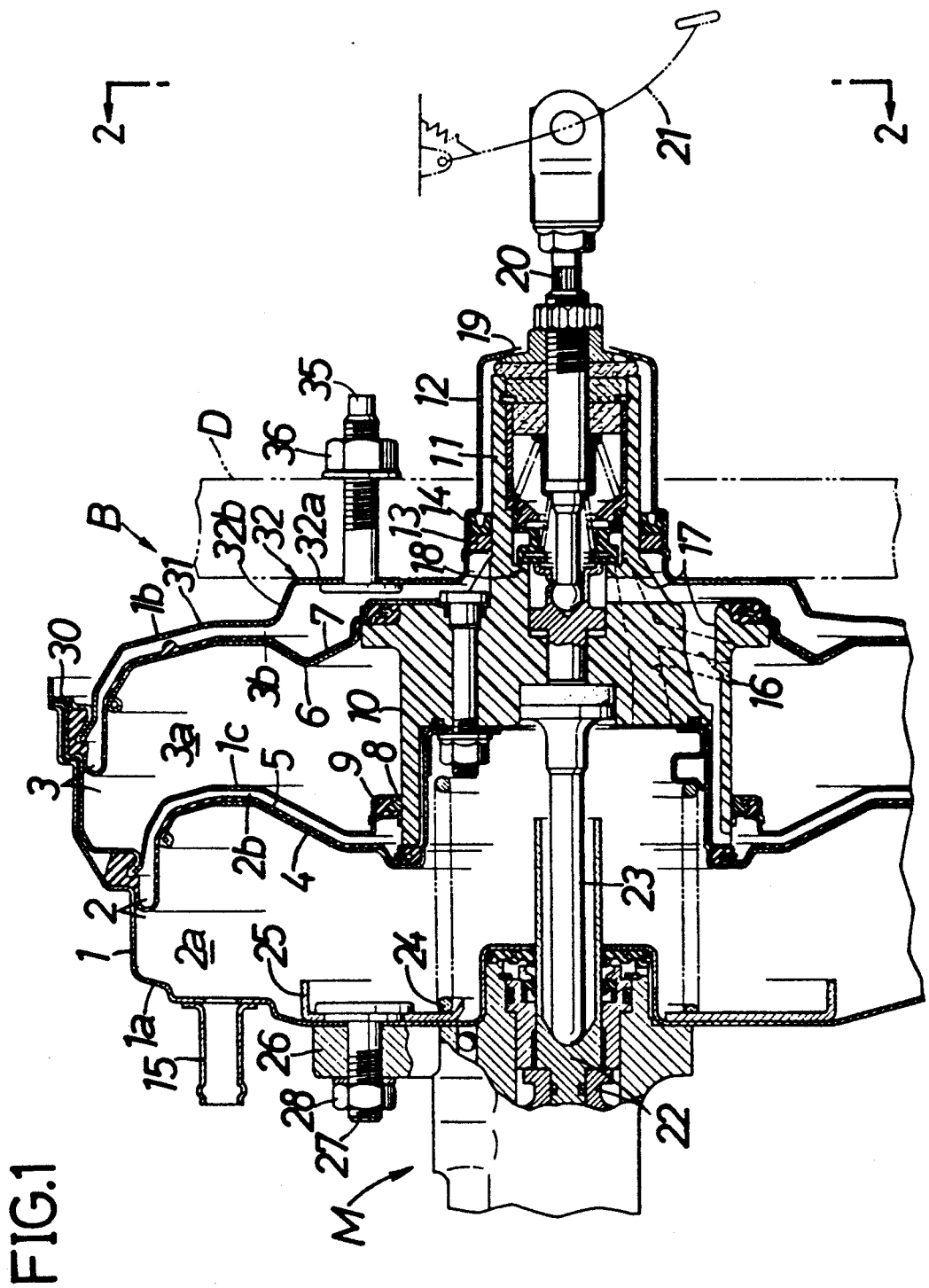
FIG. 1 is a longitudinal sectional view (sectional view taken along a line 1—1 in FIG. 2) of a vacuum booster.

Referring first to FIG. 1, a booster shell 1 of a tandem type vacuum booster B is comprised of a pair of front and rear shell halves 1a and 1b with their opposed ends coupled to each other, and a partition wall plate 1c clamped between the shell halves 1a and 1b to divide a space between the shell halves 1a and 1b into a front shell chamber 2 and a rear shell chamber 3.

The front shell chamber 2 is divided into a fore-side front vacuum chamber 2a and a back-side front working chamber 2b by a front booster piston 4 received in the front shell chamber 2 for longitudinal reciprocal movement and a front diaphragm 5 superposed and coupled to the rear surface of the front booster piston 4 and clamped between the front shell half 1a and the partition wall plate 1c. The rear shell chamber 3 is divided into a fore-side rear vacuum chamber 3a and a back-side rear working chamber 3b by a rear booster piston 6 received in the rear shell chamber 3 for longitudinal reciprocal movement and a rear diaphragm 7 superposed and coupled to the rear surface of the rear booster piston 6 and clamped between the shell halves 1a and 1b.

The front and rear booster pistons 4 and 6 are annularly formed from steel plate and integrally connected to each other through a piston boss 10 made of synthetic resin. The piston boss 10 is slidably carried on the partition wall plate 1c with a bush 8 and a sealing member 9 interposed therebetween.

A valve cylinder 11 is integrally provided at a rear end of the piston boss 10 to project therefrom and is carried in a cylindrical rearwardly-extended member 12 projectingly provided at a rear end of the booster shell 1, with a bush 13 and a sealing member 14 interposed therebetween.

The front vacuum chamber 2a is connected to a vacuum pressure source (e.g., an interior of a intake manifold in an internal combustion engine), not shown, through a vacuum pressure inlet pipe 15 and communicates with the rear vacuum chamber 3a through a first port 16 in the piston boss 10. The front and rear working chambers 2b and 3b communicate with each other through a second port 17 in the piston boss 10, and are adapted to be put in a switched manner into alternative communication with the front and rear vacuum chambers 2a and 3a and an atmospheric air inlet port 19 opened at the end face of the cylindrical rearwardly-extended member 12 by a control valve 18 mounted in the valve cylinder 11. The control valve 18 is of a known type which is operated by a brake pedal 21 through an input rod 20.

An output rod 23 is mounted to a piston boss 10 so as to project forwardly and is connected to the rear end of a piston 22 of a master cylinder M which will be described hereinafter. A return spring 24 is mounted in a compressed manner in the front vacuum chamber 2a for biasing the piston boss 10 in the direction of retraction.

A reinforcing plate 25 is bound to the inner surface of an end wall of the front shell half 1a, and a connecting flange 26 of the master cylinder M for a brake is disposed forwardly of the front shell half 1a and secured to the front shell half 1a together with the reinforcing plate 25 by a pair of connecting bolts 27 and nuts 28 threaded over the bolts 27.

Figure 2:
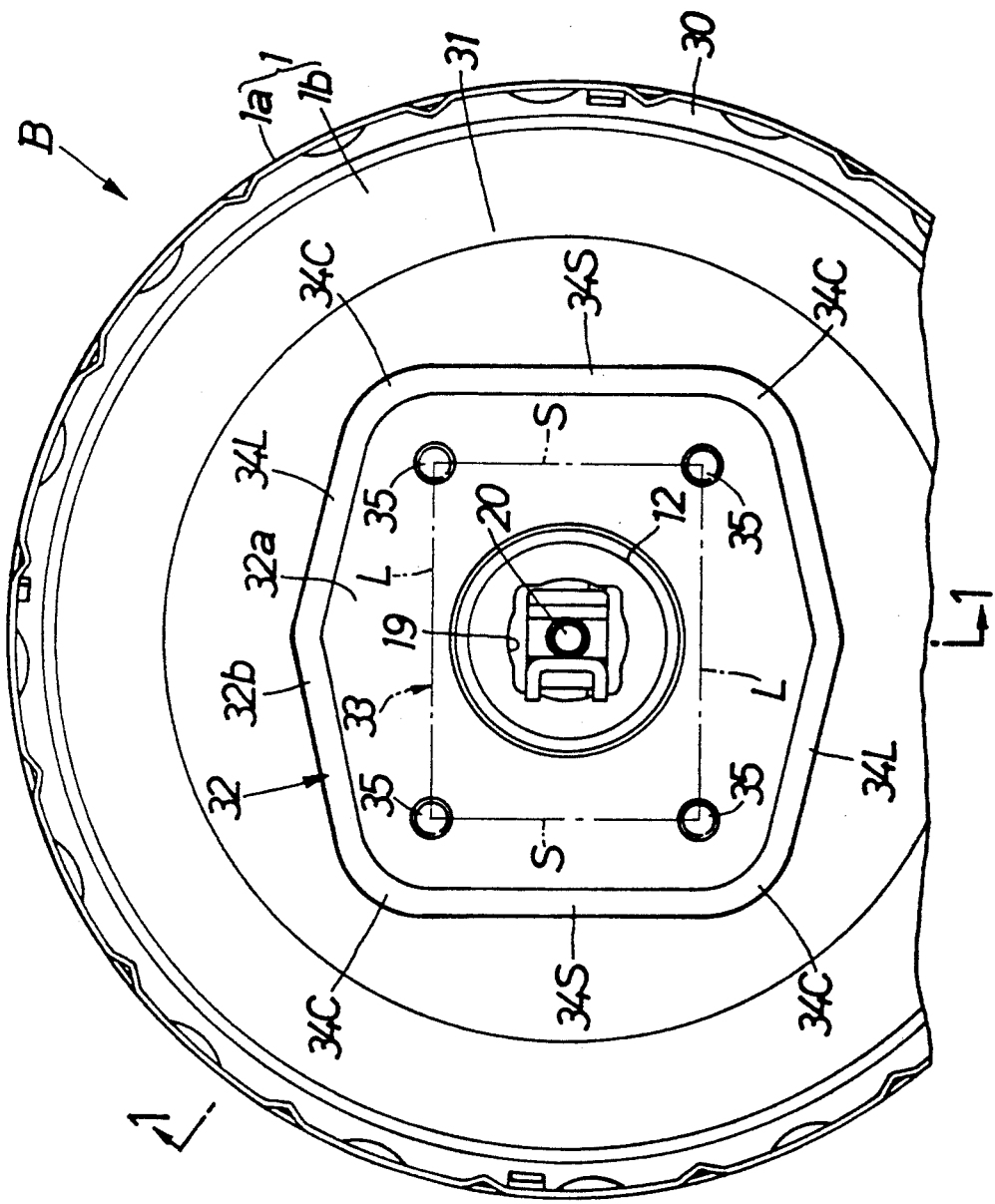
FIG. 2 is a view taken along an arrow 2—2 in FIG. 1.

As shown in FIGS. 1 and 2, the rear shell half 1b is attached to a dashboard D of a vehicle body by four connecting bolts 35 and nuts 36 threaded over the bolts 35.

As shown in FIGS. 1 and 2, the rear shell half 1b comprises a circular flange 30 coupled to the front shell half 1a, a dish-like wall 31 extended in a bent manner rearwardly and radially inwardly from the inner peripheral edge of the flange 30, and a pedestal 32 which rises rearwardly from the dish-like wall 31. The cylindrical rearwardly-extended member 12 is mounted on a central portion of the pedestal 32 to project therefrom.

The pedestal 32 includes a pedestal surface 32a and a peripheral wall 32b connected to a peripheral edge of the pedestal surface 32a. And the four connecting bolts 35 are passed through the pedestal surface 32a and secured at their heads by welding to the rear of the pedestal surface 32a. The four connecting bolts 35 are disposed at four apexes of a rectangle 33 with lateral shorter sides S and vertical longer sides L, which apexes are equidistant from the axis of the booster shell 1.

The peripheral wall 32b of the pedestal 32 is comprised of a pair of left and right shorter side walls 34S parellel to the shorter sides S, a pair of upper and lower longer side walls 34L each bent so as to be gradually separated farther from the adjacent longer side L at a central portion than at an end portion thereof, and four corner walls 34C each of which is arcuate about the corresponding connecting bolts 35 and connects the adjacent shorter and longer side walls 34S and 34L.

The operation of this embodiment will be described below.

If the input rod 20 is advanced by a depression of the brake pedal 21, the working chambers 2b and 3b are put out of communication with the vacuum chambers 2a and 3a and into communication with the atmospheric air inlet port 19 by the control valve 18, so that the booster pistons 4 and 6 can be advanced by the large difference in air pressure developed between the vacuum chambers 2a and 3a and the working chambers 2b and 3b, thereby operating the piston 22 of the master cylinder M through the output rod 23 in a boosting manner. If the brake pedal 21 is released to retract the input rod 20, the working chambers 2b and 3b are put out of communication with the atmospheric air inlet port 19 and into communication with the vacuum chambers 2a and 3a by the control valve 18, so that the difference in air pressure between the working chambers 2b and 3b and the vacuum chambers 2a and 3a is reduced, thereby permitting the booster pistons 4 and 6 to be retracted by the force of the return spring 24.

During the advancing operation of the front and rear booster pistons 6 and 7, a longitudinal tension load is applied to the booster shell 1 by a forward thrust force applied to the master cylinder M by the booster pistons 6 and 7 and a reaction force produced in the dash board D. In this case, stress is concentrated in the pedestal 32 of the rear shell half 1b secured to the dash board D by the four connecting bolts 35, particularly in the vicinity of the corner walls 34C nearest the connecting bolts 35. In this embodiment however, because the longer side wall 34L of the pedestal 32 is bent as described above, the intermediate portion of each longer side wall 34L is increased in rigidity, so that an increased burden of load is imposed on each longer side wall 34L and hence, a correspondingly decreased burden of load is imposed on each corner wall 34C, resulting in a moderated concentration of the stress around the corner wall 34C.

Although the vacuum booster of the above embodiment has been described as being of the tandem type, it is to be understood that the present invention is also applicable to a single-type vacuum booster including a single booster piston.

What is claimed is:

1. A vacuum booster comprising a pedestal which is formed bulged on an end wall of a booster shell and to which four connecting bolts are secured at four apexes of a rectangle surrounding an axis of the booster shell, said pedestal being attached to a vehicle body through said connecting bolts, wherein said pedestal has a peripheral wall comprised of a pair of shorter side walls parallel to shorter sides of said rectangle, a pair of longer side walls with each side wall bent to be gradually separated farther from a corresponding one of the longer sides of said rectangle at a central portion that at an end portion thereof, and four arcuate corner walls with each corner wall connecting adjacent shorter and longer side walls.

2. A vacuum booster according to claim 1, wherein said end wall is a rear end wall of said booster shell and further including a booster piston longitudinally movably received in said booster shell to divide an interior of the booster shell into a fore-side vacuum chamber and a back-side working chamber, a control valve for permitting said working chamber to be put into alternative communication with the atmosphere and said vacuum chamber in a switched manner, an input rod for operating said control valve, said control valve and said input rod being disposed in a valve cylinder slidably carried on said rear end wall of said booster shell and connected to said booster piston, and a master cylinder mounted to a front wall of said booster shell and driven to be advanced by said input rod and said booster piston through an output rod.

* * * * *